(12) United States Patent
Kwong et al.

(10) Patent No.: US 7,525,794 B2
(45) Date of Patent: Apr. 28, 2009

(54) EXPANDABLE ACOUSTIC CHAMBER FOR COMPUTER SYSTEMS

(75) Inventors: Wah Yiu Kwong, Beaverton, OR (US); Hong W. Wong, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 404 days.

(21) Appl. No.: 11/414,438

(22) Filed: Apr. 28, 2006

(65) Prior Publication Data

US 2007/0253153 A1    Nov. 1, 2007

(51) Int. Cl.
- *G06F 1/16* (2006.01)
- *H04R 1/20* (2006.01)
- *G10K 11/00* (2006.01)

(52) U.S. Cl. ............... 361/683; 361/680; 181/182; 381/345; 312/223.2; 400/682; 400/693; 345/168

(58) Field of Classification Search ............ 361/683, 361/680, 679; 381/306, 332, 333, 388, 338, 381/345–348, 350, 87, 88, 386, 395; 181/182, 181/185–190, 199

See application file for complete search history.

(56) References Cited

U.S. PATENT DOCUMENTS

| | | | |
|---|---|---|---|
| 4,860,367 A | | 8/1989 | Hook |
| 6,067,224 A | * | 5/2000 | Nobuchi ............ 361/683 |

OTHER PUBLICATIONS

"Speaker Design Basics", ishtek engineering solutions, http://www.ishtek.com/spkr_basics.htm, 5 pages.
Paul Hill, "Speaker enclosure design", Northavon Mini Drivers Club, http://www.niksula.cs.hut.fi/~mdobrucks/siililand/mini/diy/alien/ice/speaker.html, 3 pages.

* cited by examiner

*Primary Examiner*—Jayprakash N Gandhi
*Assistant Examiner*—Nidhi Desai
(74) *Attorney, Agent, or Firm*—Schwabe Williamson & Wyatt, P.C.

(57) ABSTRACT

A computer system may include a keyboard housing that is capable of being moved at least partially into or out of a chassis. The chassis is associated with a transducer and an air chamber. Movement of the keyboard housing may cause size of the air chamber to be adjusted. When the size of the air chamber is increased, the transducer becomes more sensitive to sound in lower frequency ranges.

19 Claims, 8 Drawing Sheets

(Top view)

FIG. 1

FIG. 4F (Side view)

FIG. 4G (Top view)

EXPANDABLE ACOUSTIC CHAMBER FOR COMPUTER SYSTEMS

FIELD OF INVENTION

The present invention relates generally to the field of sound design, and more specifically, to techniques for improving sound quality when used in computer systems.

BACKGROUND

Mobile computers today are becoming more powerful and more commonly used. To stay competitive, mobile computer manufacturers are continuously making design improvements to add more features to their mobile computers. Such improvements may include, for example, smaller form factor, larger storage capacity, faster performance, longer battery life, higher resolution and larger display, faster graphics controller, etc. It can probably be said that with these expanded features, some of the mobile computers available in the market today may compete well against some of their traditional desk top counterparts.

The expanded features of the mobile computers enable them to accommodate more complex applications. Some of these applications may include productivity applications, network communication applications, entertainment applications, etc. The entertainment applications (e.g., gaming applications) may include applications that require advanced graphics capabilities and advanced audio capabilities in order to improve user experience. Although there may be many available options to improve the graphics capabilities of the mobile computers, the same may not be said for options to improve the audio capabilities of the mobile computers.

BRIEF DESCRIPTION OF THE DRAWINGS

The present invention is illustrated by way of example and not limitation in the accompanying figures in which like references indicate similar elements and in which.

DETAILED DESCRIPTION

For some embodiments, a computer system may include a transducer and an air chamber. Size of the air chamber may be adjusted by sliding a keyboard housing partially into or out of an enclosure. Sound reproduced by the transducer may vary depending on the position of the keyboard housing relative to the enclosure.

In the following description, for purposes of explanation, numerous specific details are set forth to provide a thorough understanding of the present invention. It will be evident, however, to one skilled in the art that the present invention may be practiced without these specific details. In other instances, well known structures, processes, and devices are shown in block diagram form or are referred to in a summary manner in order to provide an explanation without undue detail.

Computer System

Figure 1:
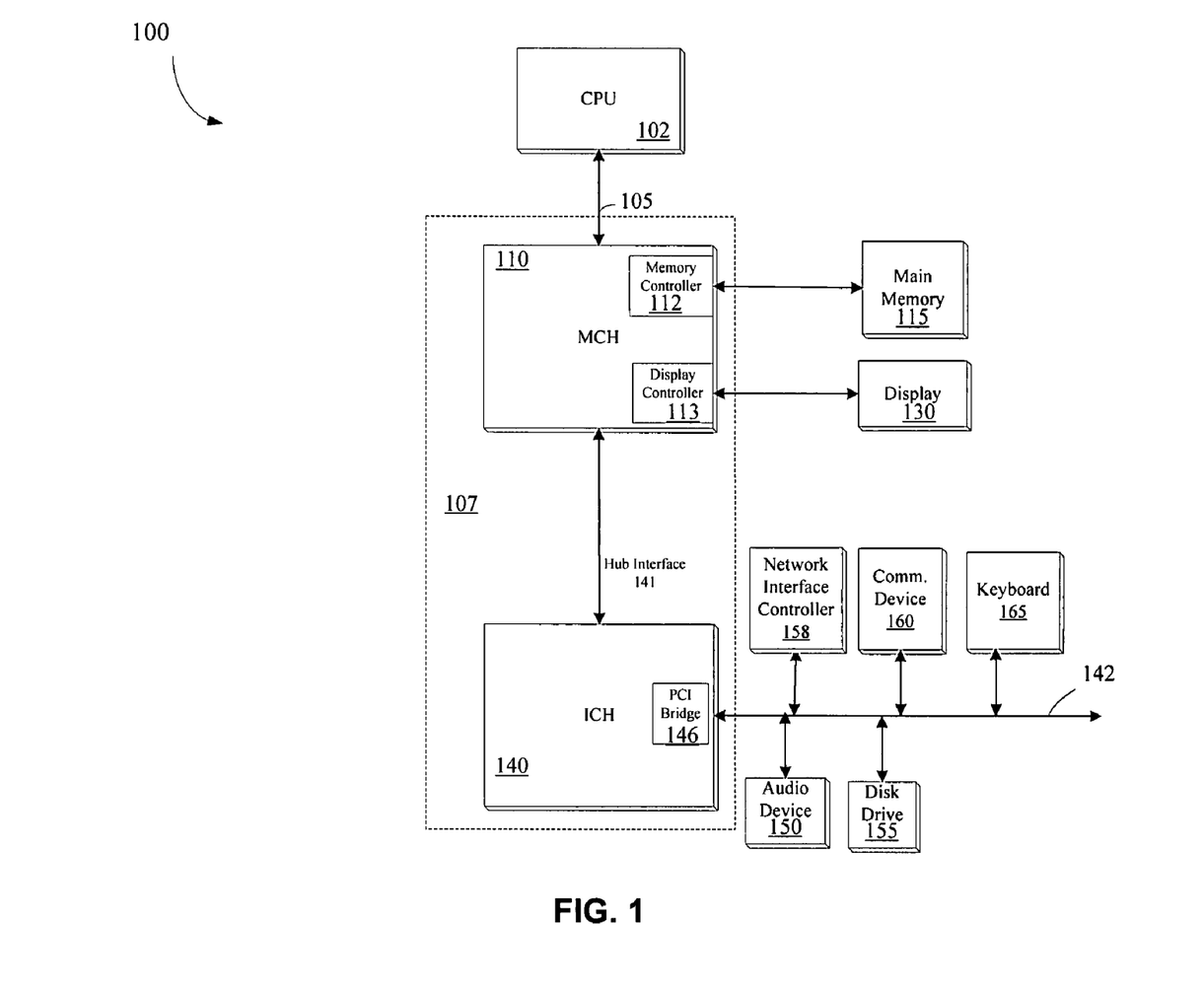
FIG. 1 is a block diagram illustrating an example of a computer system, in accordance with some embodiments.

FIG. 1 is a block diagram illustrating an example of a computer system, in accordance with some embodiments. Computer system 100 may be a mobile computer system. Computer system 100 may include an enclosure (not shown) and may receive its power from an electrical outlet, a battery (not shown), or any other power sources. The computer system 100 may include a keyboard housing (not shown). Within the keyboard housing, there may be a system board (not shown).

The system board may include a processor or central processing unit (CPU) 102. The CPU 102 and chipset 107 may be coupled to bus 105. The chipset 107 may include a memory control hub (MCH) 110. The MCH 110 may include a memory controller 112 that is coupled to memory 115. The memory 115 may store data and sequences of instructions that are executed by the CPU 102 or any other processing devices included in the computer system 100. The MCH 110 may include a display controller 113. Display 130 may be coupled to the display controller 113. The chipset 107 may also include an input/output control hub (ICH) 140. The ICH 140 may be coupled with the MCH 110 via a hub interface 141. The ICH 140 may provide an interface to peripheral devices within the computer system 100. The ICH 140 may include PCI bridge 146 that provides an interface to PCI bus 142. The PCI bridge 146 may provide a data path between the CPU 102 and the peripheral devices. In this example, an audio device 150, a disk drive 155, communication device 160, a keyboard 165, and network interface controller 158 may be connected to the PCI bus 142. The audio device 150 may be associated with a transducer (not shown). The disk drive 155 may include a storage media to store data and sequences of instructions that are executed by the CPU 102 or any other processing devices included in the computer system 100.

Speaker Enclosure

Figures 2A, 2B:
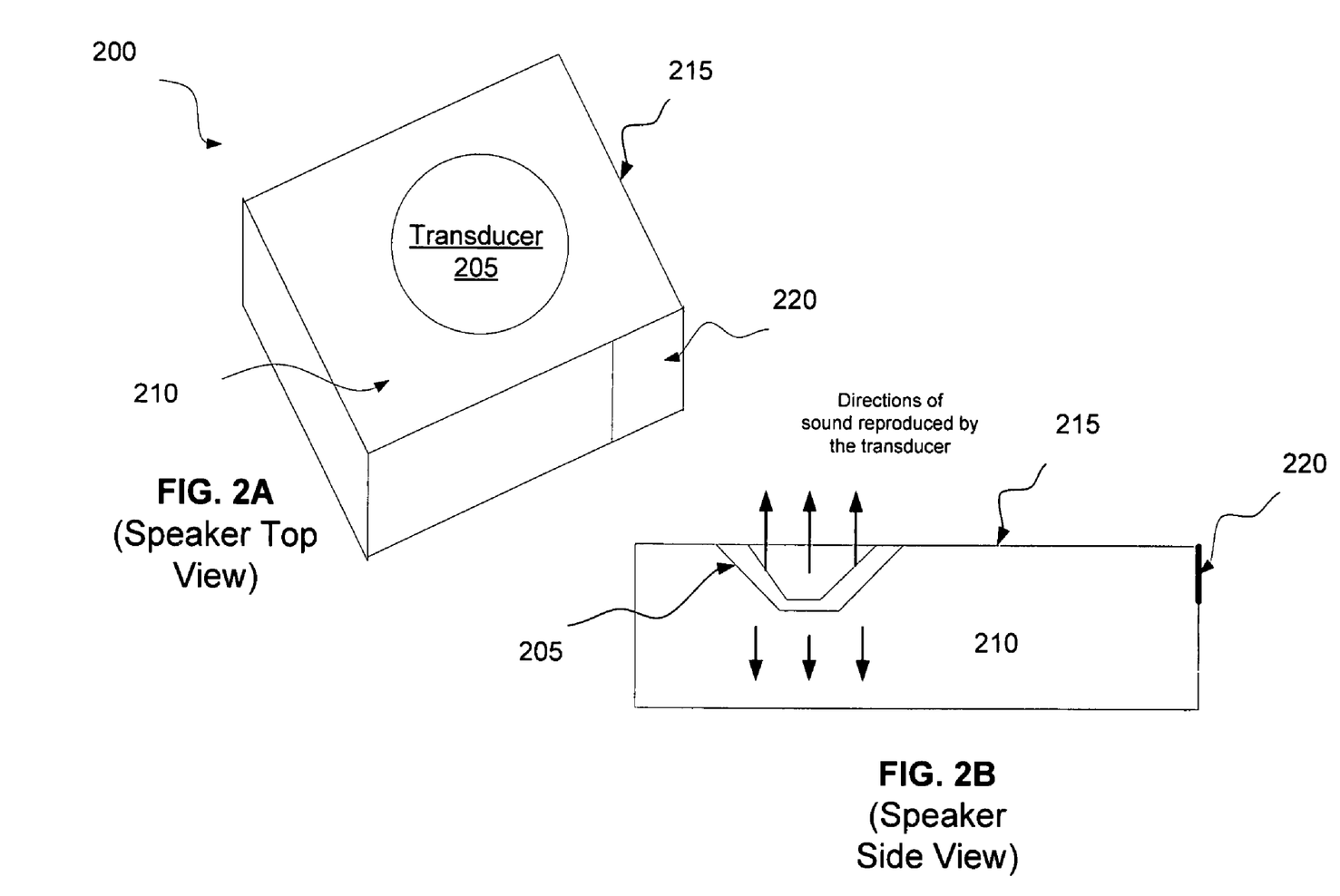
FIGS. 2A and 2B illustrate an example of a top view and a side view of a speaker enclosure design, in accordance to some embodiments.

FIGS. 2A and 2B illustrate an example of a top view and a side view of a speaker enclosure design, in accordance to some embodiments. Speaker 200 may include an enclosure 215 and a transducer 205. The speaker 200 may be a closed-enclosure speaker which means air chamber 210 inside the enclosure 215 may generally be closed. Alternatively, the speaker 200 may be a vented-enclosure speaker when the air chamber 210 is associated with a vent 220, illustrated in FIG. 2B. Some of the sound reproduced by the transducer 205 may be projected outward from the enclosure 215, while some may be projected inward (from the back of the transducer 205) to the enclosure 215. This is illustrated in the current example by the directional arrows adjacent to the transducer 205 in FIG. 2B. In general, when designing the enclosure 215, the bigger the enclosure 215 (and therefore size of the air chamber 210), the better the frequency response, especially in the lower frequency ranges.

Figures 3A, 3B:
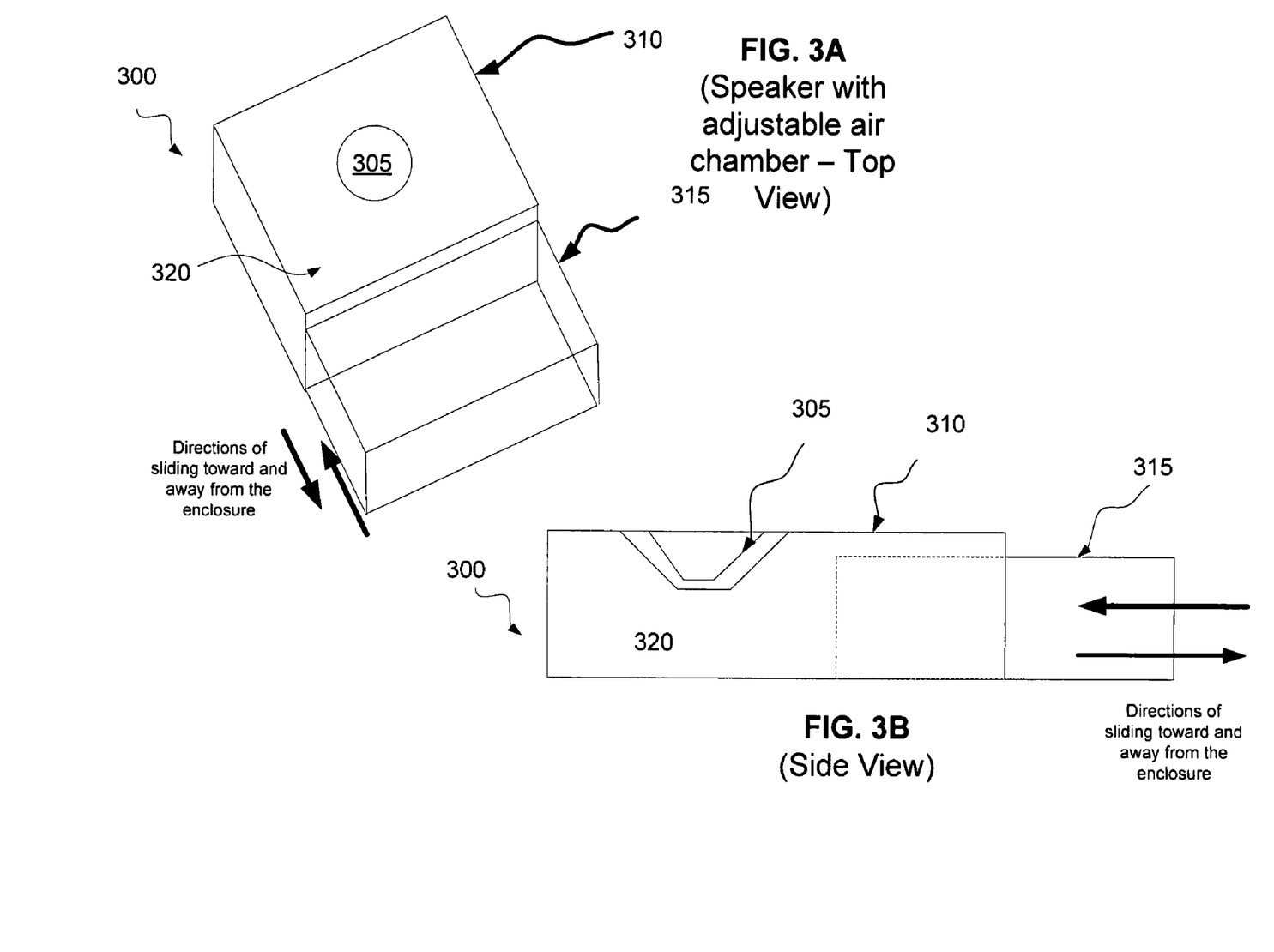
FIGS. 3A and 3B illustrate a top view and a side view example of a speaker enclosure design having an adjustable air chamber, in accordance with some embodiments.

FIGS. 3A and 3B illustrate a top view and a side view example of a speaker enclosure design having an adjustable air chamber, in accordance with some embodiments. Speaker 300 includes an enclosure 310 and a transducer 305. It may be noted that although only one transducer is illustrated, it may be possible to have more than one transducer. Furthermore, the location of the transducers may not be limited to the top portion of the enclosure 310. The speaker 300 also includes a housing 315, as illustrated in FIG. 3A. The housing 315 may at least partially slide in and out of the enclosure 310 along the respective directional arrow shown next to the housing 315, as illustrated in FIG. 3B. The housing 315 in this example may enable the size of the air chamber 320 inside the enclosure 310 to be adjusted. For example, when the housing 315 is slid into the enclosure 310, the air chamber 320 may be small. When the housing 315 is slid out of the enclosure 310, the air chamber 320 may be large. This adjustment may enable the audio quality reproduced by the transducer 305 to vary.

Mobile Computer Speaker Enclosure

The design of the speaker enclosure when applying to mobile computers may affect audio quality reproduced by the mobile computers, especially when the mobile computers may become increasingly slim. The slim form factor does not allow for meaningful air chambers for the transducer to reproduce audio of satisfactory quality.

Figures 4A, 4B, 4C:
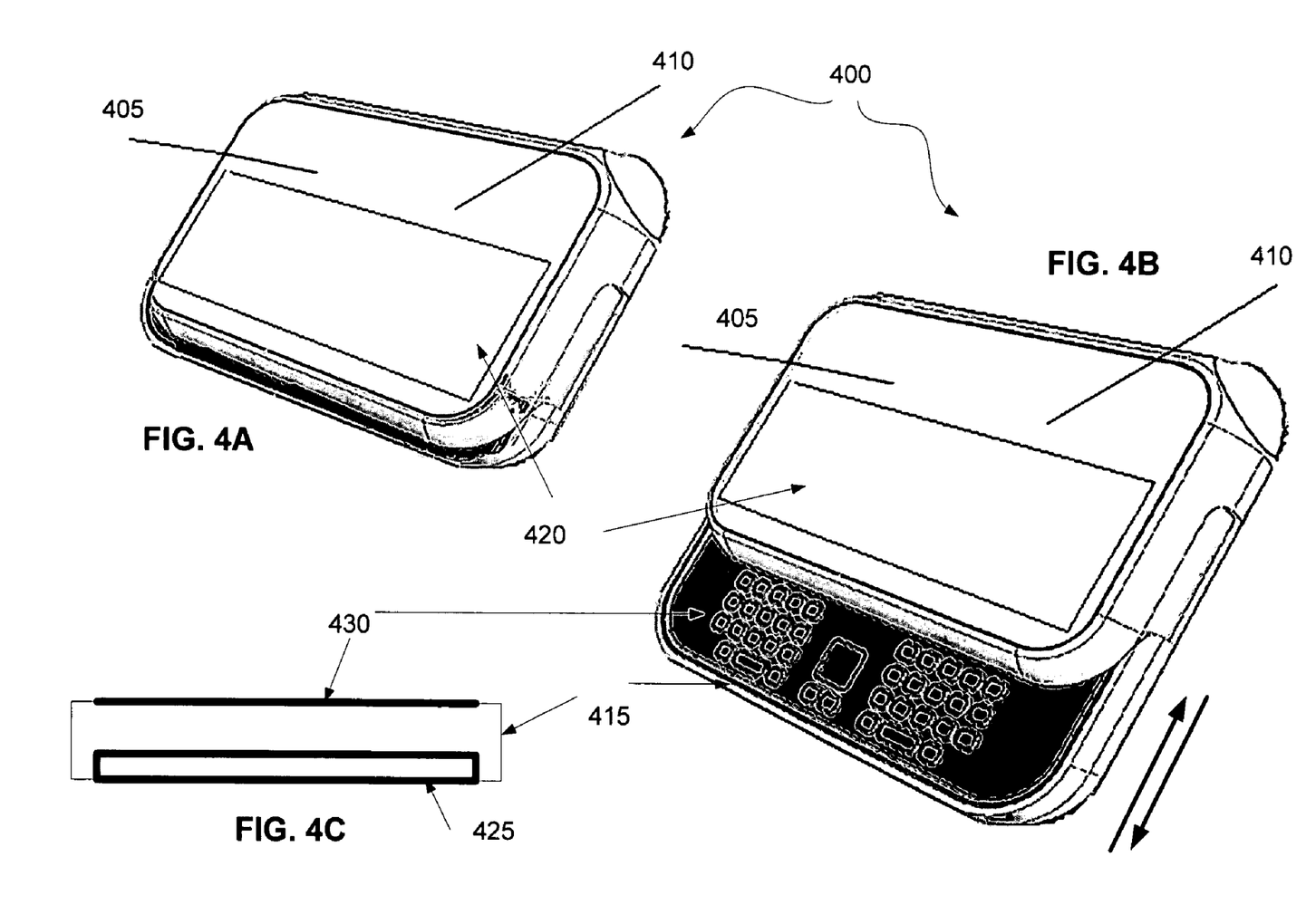
FIGS. 4A-4C illustrate an example of a mobile computer system configured with an audio system having an adjustable air chamber, in accordance with some embodiments.

FIG. 4A illustrates an example of a mobile computer system configured with an audio system having an adjustable air chamber, in accordance with some embodiments. Computer system 400 may include an enclosure 410. The enclosure 410 may include a chassis (not shown) and at least one transducer 405. The transducer 405 may be attached to a screen cover (not shown) coupled to the top portion of the enclosure 410. The enclosure 410 may also include a display 420. Although the display 420 is illustrated in this example as being on the outside surface of the enclosure 410, it may be possible that the display 420 may be located at some other location of the enclosure 410. In the current example, a keyboard housing (not shown) is hidden from view because it may be completely inside the enclosure 410. As such, the size of the air chamber associated with the transducer 405 may be at its smallest.

FIG. 4B illustrates the same mobile computer system example as illustrated in FIG. 4A. For some embodiments, the keyboard housing 415 may be moved inside or outside of the enclosure 410 (along the directional arrows shown) to create an air chamber inside the enclosure 410. It may be noted that as the keyboard housing 415 is moved further out of the enclosure 410, the transducer 405 may be more sensitive to lower frequency and the audio reproduced by the transducer 405 may cause undesirable vibration. The vibration may affect the operation of the components of the computer system 400. For some embodiments, damping material may be incorporated into the chassis associated with the enclosure 410 and with the keyboard housing 415.

FIG. 4C illustrates a side view of keyboard housing, in accordance with some embodiments. The keyboard housing 415 may include a system board 425 located toward the bottom of the keyboard housing 415 and the keyboard 430 located toward the top portion of the keyboard housing 415. The system board may include some of the electronic components as illustrated in FIG. 1. For example, the system board may include the CPU 102, the MCH 110, the ICH 140, the memory 115, and so on. Connection between the keyboard housing 415 and the enclosure 410 may be a wired connection or a wireless connection.

Figure 4D:
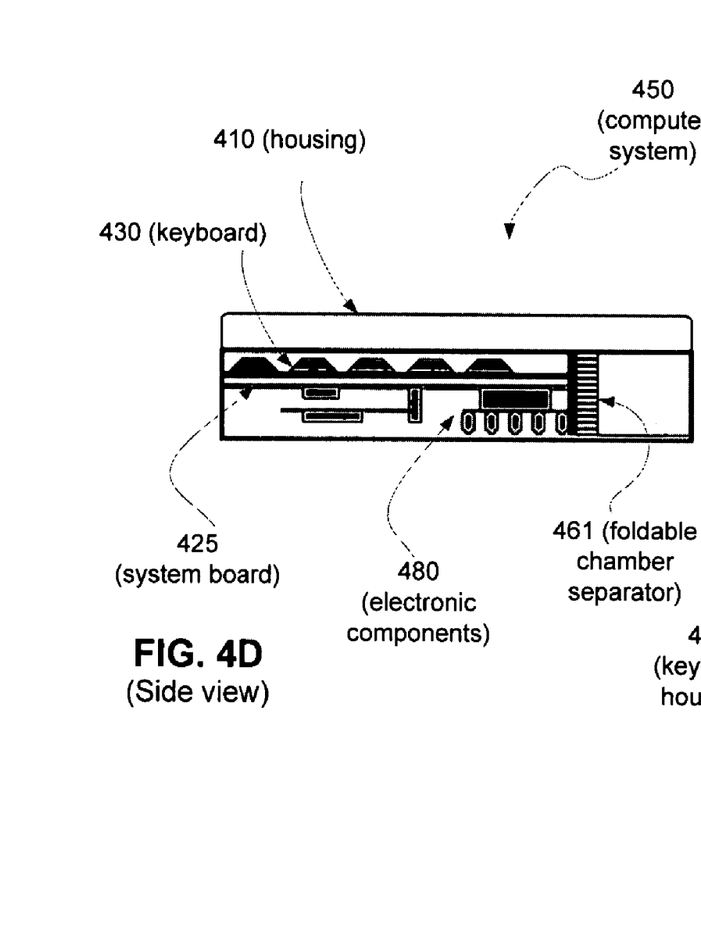
FIGS. 4D and 4E illustrate side view and top view example of a computer system having multiple transducers, in accordance with some embodiments.
Figure 4E:
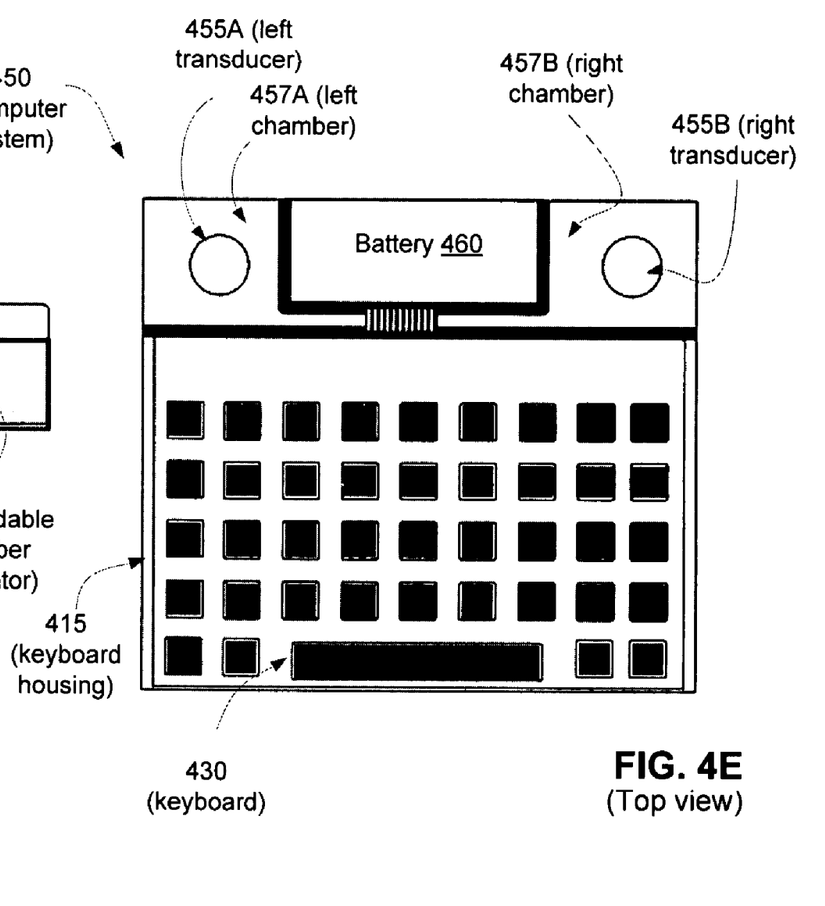

FIGS. 4D and 4E illustrate side view and top view example of a computer system having multiple transducers, in accordance with some embodiments. In this example, the keyboard housing 415 may be positioned completely inside the housing 410. The computer system 450 may include multiple transducers such as, for example, transducers 455A and 455B. The transducer 455A may be associated with air chamber 457A, while the transducer 455B may be associated with air chamber 457B. In the current example, the two air chambers 457A and 457B may be separated from one another by battery 460, as illustrated in FIG. 4E. As illustrated in FIG. 4D, the keyboard housing 415 may include the keyboard 430, a system board 425 and electronic components (e.g., processor, memory, etc.) 480 coupled to the system board 425.

For some embodiments, when there are multiple transducers, some of the transducers may be activated based on the position of the keyboard housing 415 relative to the enclosure 410. For example, when the keyboard housing 415 is in a first position relative to the enclosure 410, only one set of transducer may be activated. When the keyboard housing 415 is in a second position relative to the enclosure 410, a second set of transducers may be activated. The second set of transducers may be deactivated when the keyboard housing 415 is moved from the second position back to the first position.

Figure 4F:
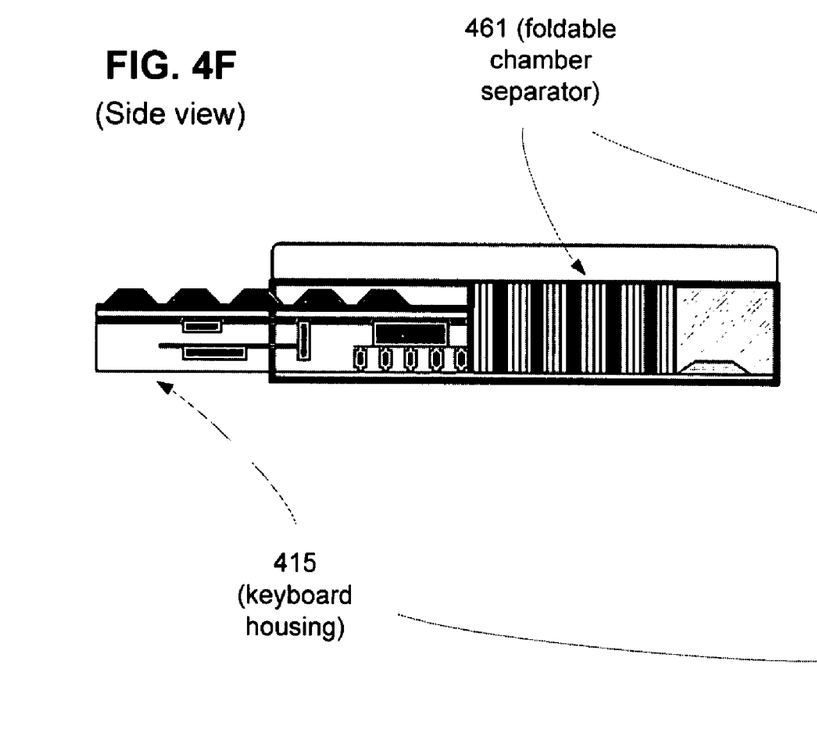
FIGS. 4F and 4G illustrate side view and top view example of a computer system having compressible air chamber separator, in accordance with some embodiments.
Figure 4G:
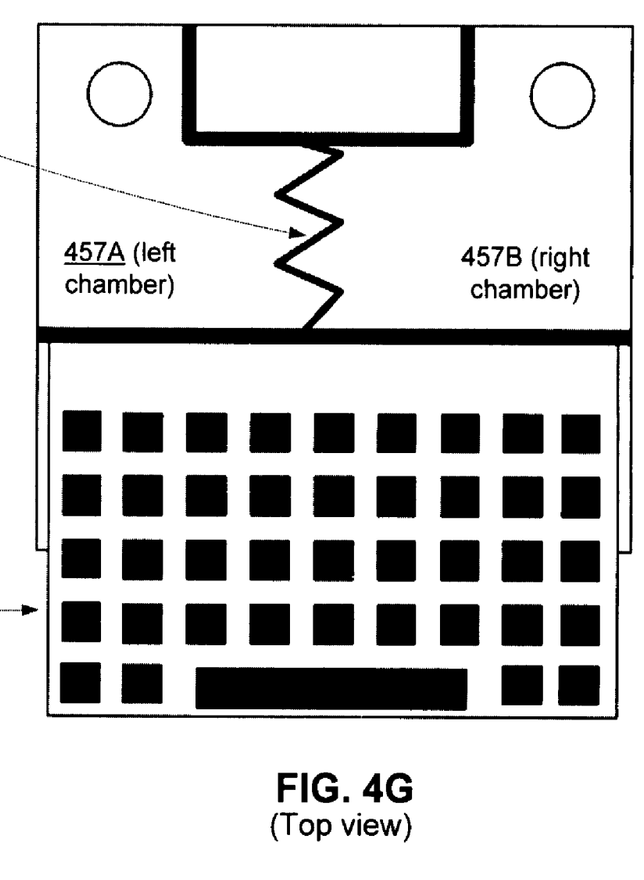

FIGS. 4F and 4G illustrate side view and top view example of the same computer system, but with the keyboard housing 415 extended outward from the enclosure 410, in accordance with some embodiments. The air chambers 457A and 457B may be separated from one another by a collapsible or foldable separator 461, as illustrated in FIGS. 4D to 4G. The sliding movement of the keyboard housing 415 may expand or compress the air chamber separator 461 and accordingly the size of both of the air chambers 457A and 457B at the same time. In FIGS. 4F and 4G, the air chamber separator 461 is illustrated as being uncompressed due to the position of the keyboard housing 415. The combination of the transducers 455A and 455B, the air chambers 457A and 457B, and the enclosure 410 may be viewed as a speaker subsystem of the computer system 450.

Figure 5:
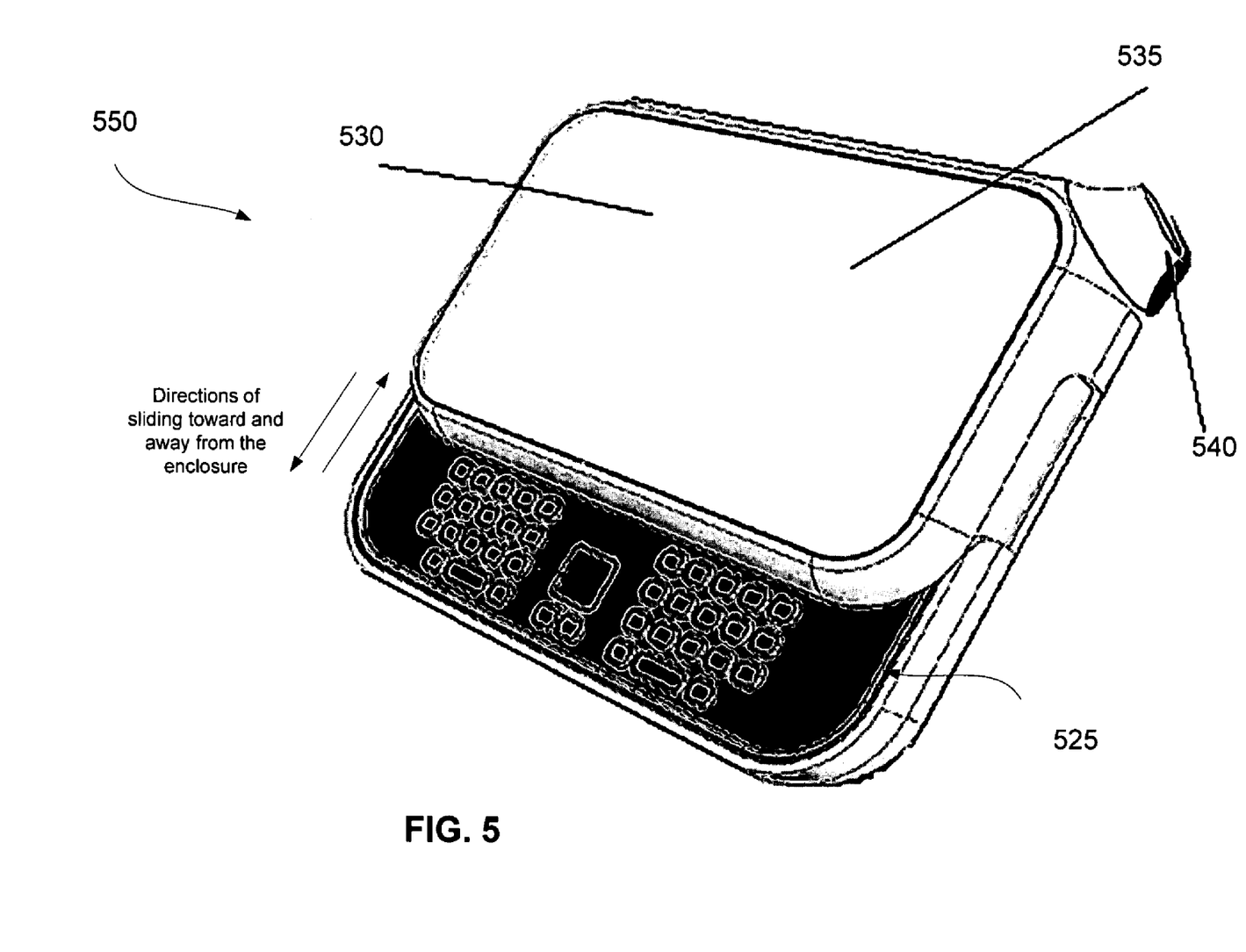
FIG. 5 illustrates an example of a mobile computer system configured with an audio system having an adjustable air chamber and a vent, in accordance with some embodiments.

FIG. 5 illustrates an example of a mobile computer system configured with an audio system having an adjustable air chamber and a vent, in accordance with some embodiments. Computer system 550 may include an enclosure 535, at least one transducer 530, and a keyboard housing 525. The computer system 550 may be similar to the computer 400 illustrated in FIGS. 4A and 4B, except that the computer system 550 may include a vent 540. The vent 540 may be connected to the air chamber inside the enclosure 535. For some embodiments, the size of the vent 540 may be adjusted to change the quality of the sound reproduced by the transducer 530. For example, the vent 540 may be rotated clockwise and counterclockwise to increase or decrease its size, respectively.

Process

Figure 6:
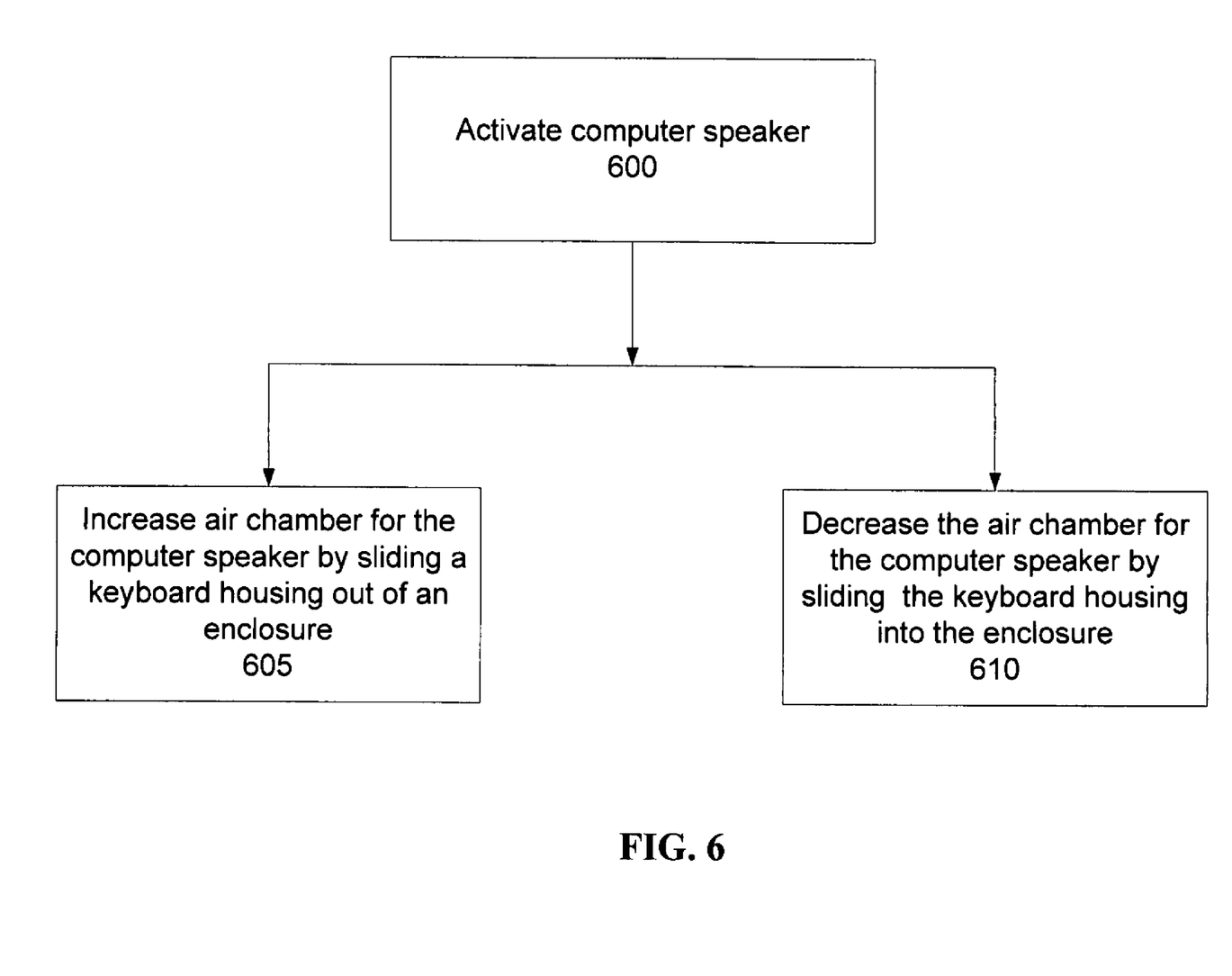
FIG. 6 is a block diagram illustrating an example of a process that may be used, in accordance with some embodiments.

FIG. 6 is a block diagram illustrating an example of a process that may be used, in accordance with some embodiments. This process relates to adjusting an air chamber to change the sound quality of one or more transducers in a computer system having moveable keyboard housing, similar to the computer system 400 illustrated in FIGS. 4A and 4B. At block 600, the transducer is activated. This may be activated automatically, or it may be manually activated by a user of the computer system. Depending on the current position of the keyboard housing relative to the enclosure of the computer system, the user may desire to adjust the sound reproduced by the transducer. When the user desires to increase the air chamber associated with the transducer, the user may move the keyboard housing further out of the housing, as shown in block 605. When the user desires to decrease the air chamber, the user may move the keyboard housing further into the housing, as shown in block 610.

Although some embodiments of the present invention have been described with reference to specific exemplary embodiments, it will be evident that various modifications and changes may be made to these embodiments without departing from the broader spirit and scope of the invention as set forth in the claims. Accordingly, the specification and drawings are to be regarded in an illustrative rather than a restrictive sense.

What is claimed is:

1. A system, comprising:
   an enclosure including a first transducer and a display; and
   a keyboard housing coupled to the enclosure, the keyboard housing including a keyboard, the keyboard housing configured to be moved into and out of the enclosure, wherein size of a first air chamber associated with the first transducer is increased when the keyboard housing is moved at least partially out of the enclosure.

2. The system of claim 1, wherein the size of the first air chamber associated with the first transducer is decreased when the keyboard housing is moved at least partially into the enclosure.

3. The system of claim 2, wherein the keyboard housing is to include a system board.

4. The system of claim 3, wherein the housing is coupled to a vent.

5. The system of claim 4, wherein size of the vent is adjustable.

6. The system of claim 4, wherein the housing includes damping material to reduce vibration caused by the first transducer.

7. The system of claim 6, wherein the housing includes a second transducer associated with a second air chamber, the second air chamber separated from the first air chamber by a compressible separator, wherein size of the second air chamber and state of the compressible separator are changed based on movement of the keyboard housing.

8. An apparatus, comprising:
   a computer system chassis;
   at least one transducer coupled to the computer system chassis; and
   a housing coupled to the computer system chassis and capable of being moved in and out of the computer system chassis, wherein the housing includes a keyboard and sound reproduced by the transducer is to be affected by size of an air chamber within the computer system chassis, and wherein the size of the air chamber is to be adjusted by movement of the housing.

9. The apparatus of claim 8, wherein the housing includes a system board.

10. The apparatus of claim 9, wherein the housing includes material to reduce vibration associated with the transducer.

11. The apparatus of claim 9, wherein the computer system chassis includes material to reduce vibration associated with the transducer.

12. The apparatus of claim 9, wherein the transducer is coupled to a vent associated with the computer system chassis.

13. A method, comprising:
    activating a speaker subsystem in a computer system, the speaker subsystem including a transducer and an adjustable air chamber; and
    adjusting size of the air chamber by causing a housing associated with the speaker subsystem to move, wherein the housing includes a keyboard.

14. The method of claim 13, wherein the housing is capable of being moved at least partially into or out of the speaker subsystem, and wherein when the housing is moved partially out of the speaker subsystem, the transducer is move sensitive to sound at lower frequency ranges.

15. The method of claim 14, wherein the speaker subsystem is included in a chassis associated with the computer system, and wherein the housing includes a system board and vibration damping material.

16. The method of claim 15, further comprising:
    adjusting a vent associated with the speaker subsystem to adjust quality of sound reproduced by the transducer.

17. A system, comprising:
    a speaker subsystem including a first transducer, an enclosure, and an air chamber within the enclosure;
    a housing coupled to the enclosure and including a system board and a keyboard, the housing capable of being moved relative to the enclosure, wherein movement of the housing is to cause change in size of the air chamber and change in low frequency response of the transducer.

18. The system of claim 17, wherein the housing includes vibration dampening material.

19. The system of claim 18, wherein the speaker system includes a second transducer, wherein the second transducer is activated when the movement of the housing increases the size of the air chamber, and wherein the second transducer is deactivated when the movement of the housing decreases the size of the air chamber.

\* \* \* \* \*